United States Patent [19]
Rosenthal et al.

[11] Patent Number: 5,101,488
[45] Date of Patent: Mar. 31, 1992

[54] METHOD FOR RETRIEVING AND UPDATING DATA IN A REAL-TIME DATA BASE SYSTEM

[75] Inventors: Robert S. Rosenthal, Schaumburg; Valentin Oprescu, Glenview, both of Ill.

[73] Assignee: Motorola, Inc., Schaumburg, Ill.

[21] Appl. No.: 346,044

[22] Filed: May 2, 1989

[51] Int. Cl.⁵ .......................................... G06F 12/14
[52] U.S. Cl. .................................................. 395/425
[58] Field of Search ............................... 364/200, 900

[56] References Cited

U.S. PATENT DOCUMENTS

| | | | |
|---|---|---|---|
| 4,399,504 | 8/1983 | Obermarck et al. | 364/200 |
| 4,476,528 | 10/1984 | Matsumoto et al. | 364/200 |
| 4,480,304 | 10/1984 | Carr et al. | 364/200 |
| 4,635,189 | 1/1987 | Kendall | 364/200 |
| 4,698,752 | 10/1987 | Goldstein et al. | 364/200 |
| 4,791,554 | 12/1988 | Hirota et al. | 364/200 |
| 4,821,175 | 4/1989 | Hikita et al. | 364/200 |
| 4,961,139 | 10/1990 | Hong et al. | 364/200 |
| 4,965,719 | 10/1990 | Shoens et al. | 364/200 |

OTHER PUBLICATIONS

*IBM Technical Disclosure Bulletin*, vol. 29, No. 3, Aug. 1986, pp. 1193-1195 "Locking Mechanism for Controlling Access to Data Base Resources".
*IBM Technical Disclosure Bulletin*, vol. 21, No. 4, Sep. 1978, pp. 1723-1728, "Multilevel Locking with Deadlock Avoidance", D. B. Lomet.
Lehman, Philip L. and Yao, S. Bing, "Efficient Locking for Concurrent Operations on B-Trees", ACM Transactions on Data base Systems, vol. 6, No. 4, Dec 1981, pp. 650-670.

Primary Examiner—Michael R. Fleming
Assistant Examiner—Glenn A. Auve
Attorney, Agent, or Firm—Walter W. Nielsen; Paul F. Wille

[57] ABSTRACT

In a real-time data base system, data is updated by reading the data and checking an exception flag associated with a locked status. If the exception flag is not set, the data is locked and read in an updatable fashion. If the data is locked, the data may still be read if a peek-mode access is requested.

15 Claims, 5 Drawing Sheets

|  |  | NL | | SW | | SR | | EX | |
|---|---|---|---|---|---|---|---|---|---|
|  |  | R | U | R | U | R | U | R | U |
| NL | R | Y | N | Y | Y | Y | Y | Y | Y |
|    | U | – | – | – | – | – | – | – | – |
| SW | R | Y | N | Y | Y | Y | Y | N | N |
|    | U | Y | N | Y | Y | N | N | N | N |
| SR | R | Y | N | Y | N | Y | N | N | N |
|    | U | Y | N | Y | N | Y | N | N | N |
| EX | R | N | N | N | N | N | N | N | N |
|    | U | N | N | N | N | N | N | N | N |

*FIG. 4*

METHOD FOR RETRIEVING AND UPDATING DATA IN A REAL-TIME DATA BASE SYSTEM

RELATED INVENTIONS

The present invention is related to the following inventions, all assigned to the assignee of the present invention:

Computer System with Data Residence Transparency and Data Access Transparency, invented by Andrew Kun, Frank Kolnick, and Bruce Mansfield, having Ser. No. 07/300,687 and filed Jan. 1, 1989, a continuation of Ser. No. 07/110,614 (now abandoned), which was a continuation of Ser. No. 06,730,929 (now abandoned);

Method of Inter-Process Communication in a Distributed Data Processing System, invented by Bernhard Weisshaar, Andrew Kun, Frank Kolnick, and Bruce Mansfield, having U.S. Pat. No. 4,694,396, and issued on Sept. 15, 1987;

Virtual Single Machine with Message-Like Hardware Interrupts and Processor Exceptions, invented by Andrew Kun, Frank Kolnick, and Bruce Mansfield, having Pat. No. 4,835,685 issued May 30, 1989;

Process Traps in a Distributed Message-Based Operating System, invented by Gabor Simor, having Ser. No. 07/476,115 filed on Jan. 29, 1990, a continuation of Ser. No. 07/336,630 (now abandoned), which was a continuation of Ser. No. 07/000,624 (now abandoned);

Distributed Computer System with Network and Resource Status Management, invented by Leslie G. Seymour, having Ser. No. 294,037, and filed on Jan. 6, 1989; and Distributed Computer System with Process Status Monitoring, invented by Leslie G. Seymour, having Ser. No. 318,101, and filed on Mar. 2, 1989.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office file or records, but otherwise reserves all copyright rights whatsoever.

FIELD OF THE INVENTION

The present invention relates, in general, to data bases and data base management systems (DBMS) and, more particularly, to a method for retrieving and updating data in a real-time data base system.

BACKGROUND OF THE INVENTION

A data base management system is a software application whose function is to interface between a data base and any applications/processes requesting access to the data base. In general, a data base management system provides for the organization of, access to, and control of a data base.

A data base is a collection of logically organized data items. A data base is organized into tables, each table having one or more records contained therein. Each record, in turn, is divided into one or more fields. From a visual perspective, the table may be referred to as a view. The rows of a view are related to the records of the data base. The columns of a view are related to the fields of the records. These terms will be used interchangeably herein.

The present invention, while applicable to any data base environment, has been implemented in a distributed data processing system consisting of two or more data processing systems which are capable of functioning independently but which are so coupled as to send and receive messages to and from each other.

A local area network (LAN) is an example of a distributed data processing system. A typical LAN comprises a number of autonomous data processing "nodes", each comprising at least a processor and memory. Each node is capable of conducting data processing operations independently. In addition, each node is coupled to a network of other nodes which may be, for example, a loop, star, tree, etc., depending upon the design considerations.

A "process", as used herein, is a self-contained package of data and executable procedures which operate on that data, comparable to a "task" in other known systems. Within the present invention a process can be thought of as comparable to a set (module) of subroutines in terms of size, complexity, and the way it is used. The difference between processes and subroutines is that processes can be created and terminated dynamically and can execute concurrently with their creator and other sets (modules) of "subroutines".

Every process in the distributed data processing system of the present invention has a unique identifier connector by which it can be referenced. The connector is assigned by the system when the process is created. The connector is used by the system to physically locate the process.

Every process also has a non-unique, symbolic "name", which is a variable-length string of characters. In general, the name of a process is known system-wide. To restrict the scope of names, the concept of a "context" is utilized. This concept is described in detail in copending U.S. Pat. applications having Ser. Nos. 000,621 and 476,115 cited in detail above. Basically, a context is a collection of related processes whose names are not known outside of the context.

A process in one context cannot symbolically communicate with, and does not know about, processes inside other contexts. All interaction across boundaries is by means of messages and pass through a "context process".

A "message" is a variable length buffer containing data which tells a process what to do and/or supplies it with information it needs to carry out its operation. Messages are queued from one process to another by name or connector. Queuing avoids potential synchronization problems and is used instead of semaphores, monitors, etc. The sender of the message is free to continue after the message is sent. When the receiver attempts to get the message, it will be suspended until one arrives if none are already waiting in its queue. Optionally, the sender can specify that it wants to wait for a reply and is suspended until the specific message arrives. Messages from any other source are not dequeued until after that happens.

Messages provide the mechanism by which user transparency is achieved. A process located anywhere in the system may send a message to any other process anywhere within the system if the sending process has the receiving process's name or connector. This permits processes to be dynamically distributed across the system at any time and to gain optimal throughput without changing the processes to which they are referenced. Sending messages by connector obviates the need for a name search and ignores context boundaries. This is the most efficient method of communicating.

In the present invention messages are generally composed of a message ID and one or more "triples". The message ID is a word describing the purpose of the message (e.g. status) or the request (e.g. get) encoded in it. A triple is a data portion made of three fields. The first field generally identifies the type of triple. The second field indicates how many bytes of information are contained in the third field, which may be zero (0). The third field contains the data of the message, such as a process status code.

A problem of present real-time data base systems is found in the method used to retrieve and update data. A potential exists for more than one user to access the data. This can result in the data being modified by one user while being used for another purpose by a second user.

One prior art solution to this problem is to limit access to the data to only one user. The problem here is that this is no longer a real-time system.

In an effort to rectify this condition of limited data access, a peek mode was developed to permit the data to be viewed but not modified. This functions to prevent modification even if the modifying process has general write permission. A drawback to these types of systems is that the data must be accessed a second time in order to eventually effect the modifications. This adds a great deal of overhead to the process.

Accordingly, it is an object of the present invention to provide a method for retrieving and updating data in a real-time data base system that overcomes the above deficiencies.

A further object of the present invention is to provide a method for retrieving and updating data in a real-time data base system which utilizes a peek-mode.

Another object of the present invention is to provide a method for retrieving and updating data in a real-time data base system which does not require that the data be retrieved a second time to effect a data modification.

Still another object of the present invention is to provide a monitor for retrieving and updating data in a real-time data base system which will reduce the amount of overhead needed to effect a data modification.

SUMMARY OF THE INVENTION

A particular embodiment of the present invention comprises a method for retrieving and updating data in a real-time data base system by utilization of a locking mechanism. When a peek command is issued, the data is read. If the data is not locked, it is obtained in an updatable mode. If the requested lock is denied, the data is obtained in a read-only mode and may not be updated.

BRIEF DESCRIPTION OF THE DRAWINGS

FIG. 4 shows a chart illustrating various data locks.

DETAILED DESCRIPTION OF THE DRAWINGS

Figure 1:
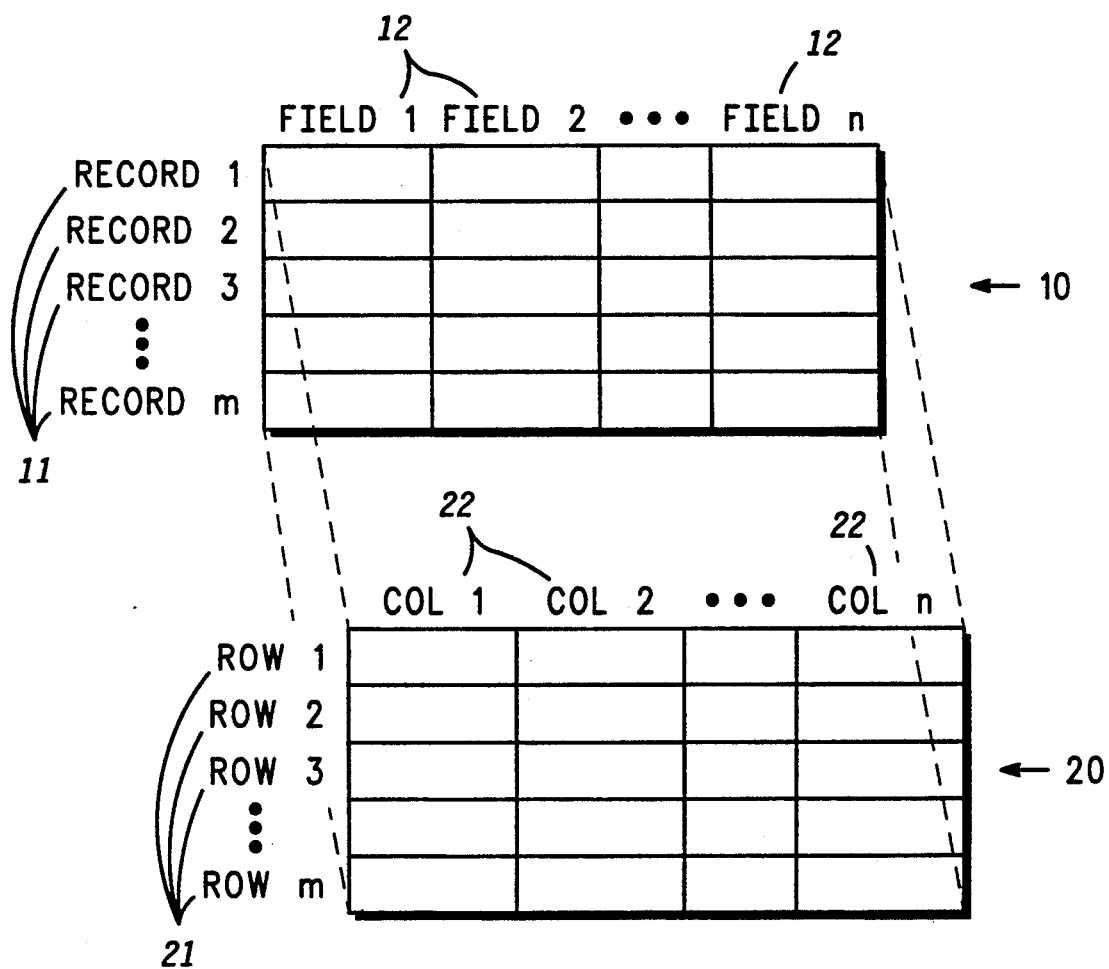
FIG. 1 shows a visual representation of a data base table and a base view in block form.

Referring initially to FIG. 1, a visual representation of a data base table, generally designated 10 is illustrated. As shown, table 10 is visually represented by a base view generally designated 20. Table 10 consists of records 11 which are comprised of fields 12. In base view 20, rows 21 and columns 22 correspond to records 11 and fields 12, respectively.

Figure 2:
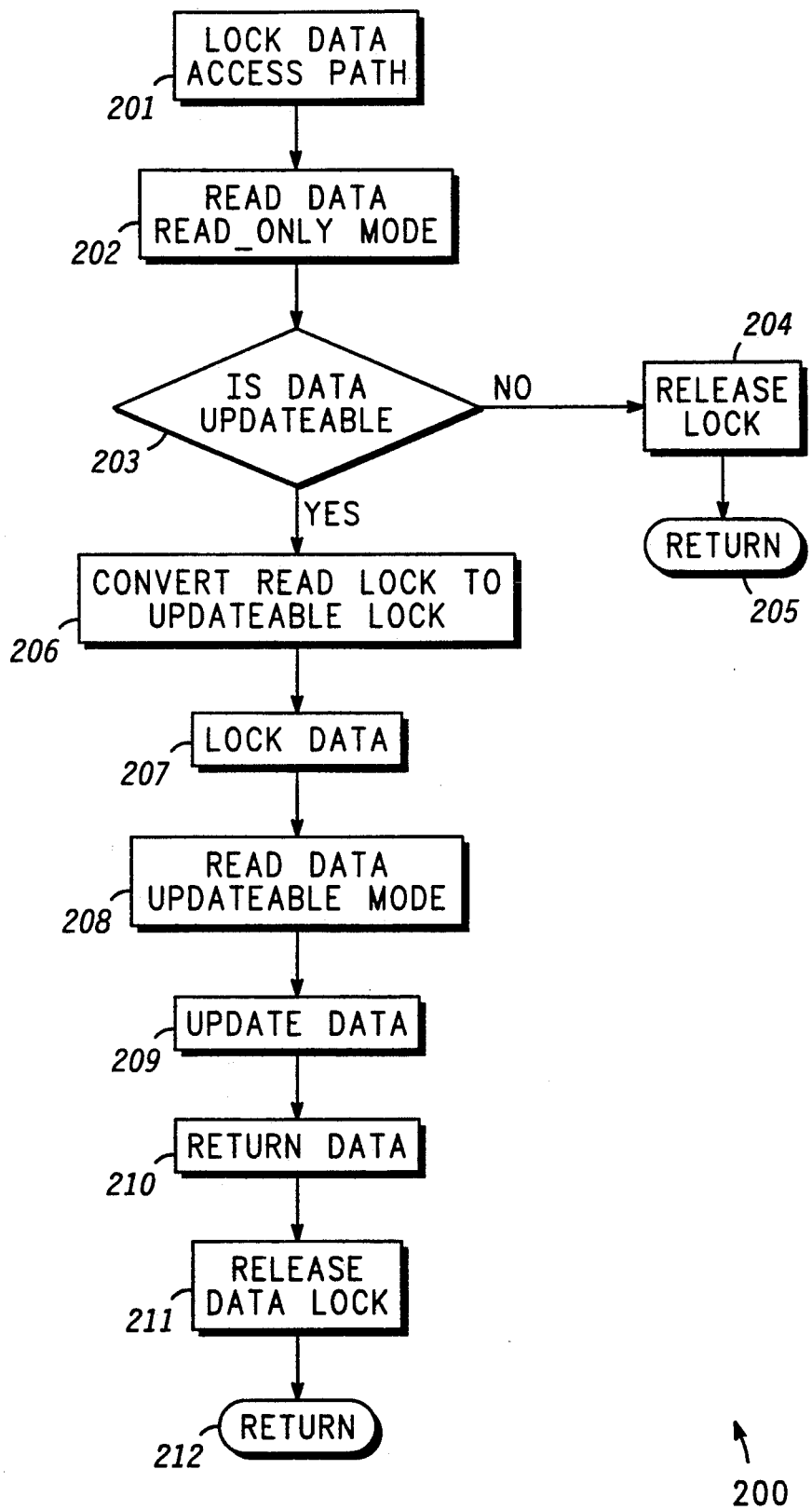
FIG. 2 shows a block diagram of a flowchart illustrating a prior art method for retrieving and updating data.

Referring now to FIG. 2, a block diagram of a flowchart illustrating a prior art method for retrieving and updating data, generally designated 200, is illustrated. The routine commences with step 201 where the access path to the data to be obtained is locked. Locking prevents access by other users/processes to the data while locked.

Following step 201, the data is read in a READ.ONLY mode in step 202. The routine then determines, in decision step 203, whether the data is updatable. If the data is not updatable, the data lock is released, step 204, and the routine returns, step 205.

If the data is updatable, the routine moves to step 206 where the data lock is converted to updatable and the data is again read, step 208. In the second read cycle, the data is read in an updatable mode.

Once read, the data is updated, step 209, and returned, step 210. The lock is then released, step 211, and the routine returns, step 212.

As illustrated, the prior art method requires that the data be read twice in order to perform a single update. In addition, while the data is read the first time for evaluation, the data is locked off from other users.

Figure 3A:
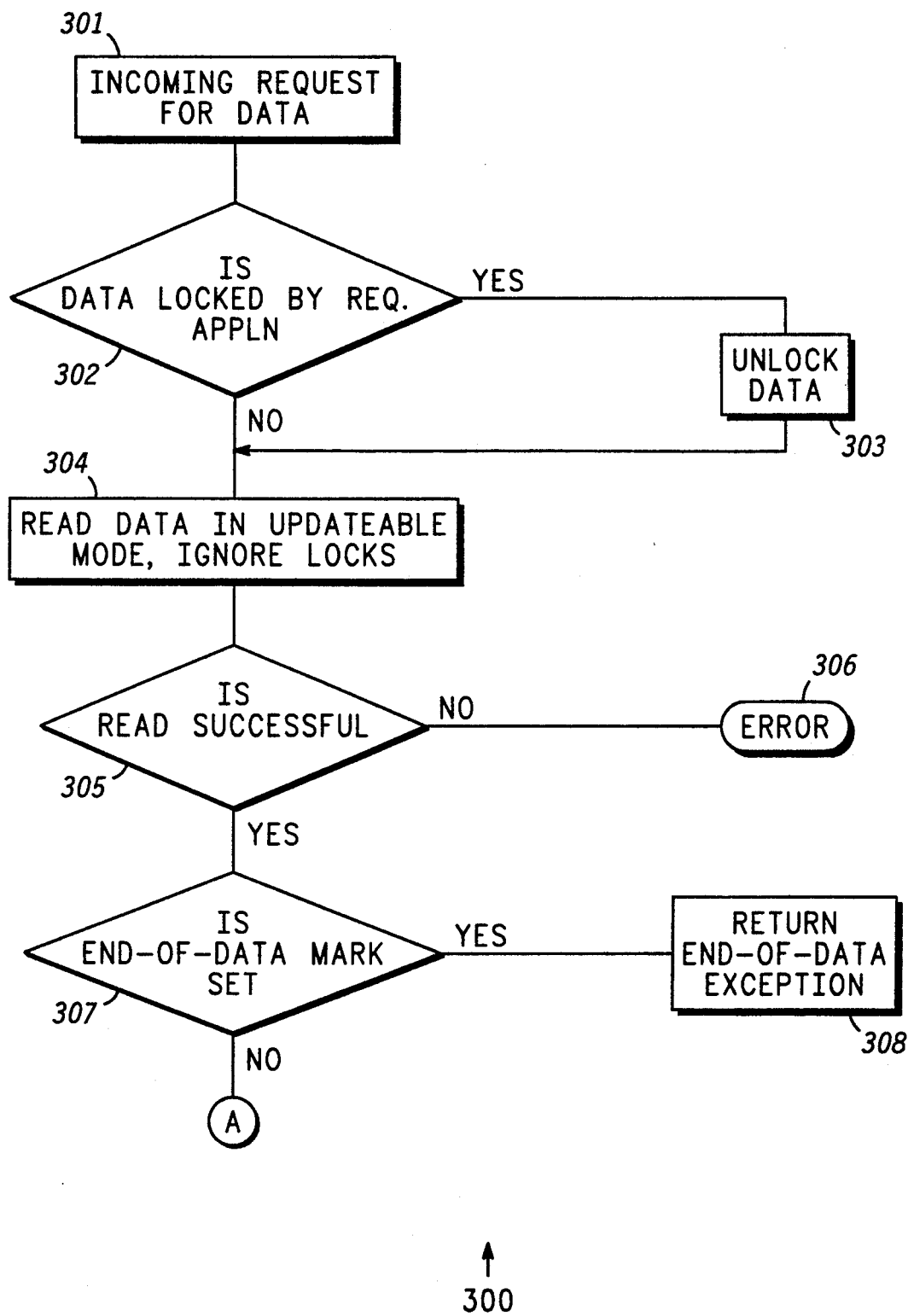
FIGS. 3A-3B shows a block diagram of a flowchart illustrating a method embodying the present invention for retrieving and updating data.
Figure 3B:
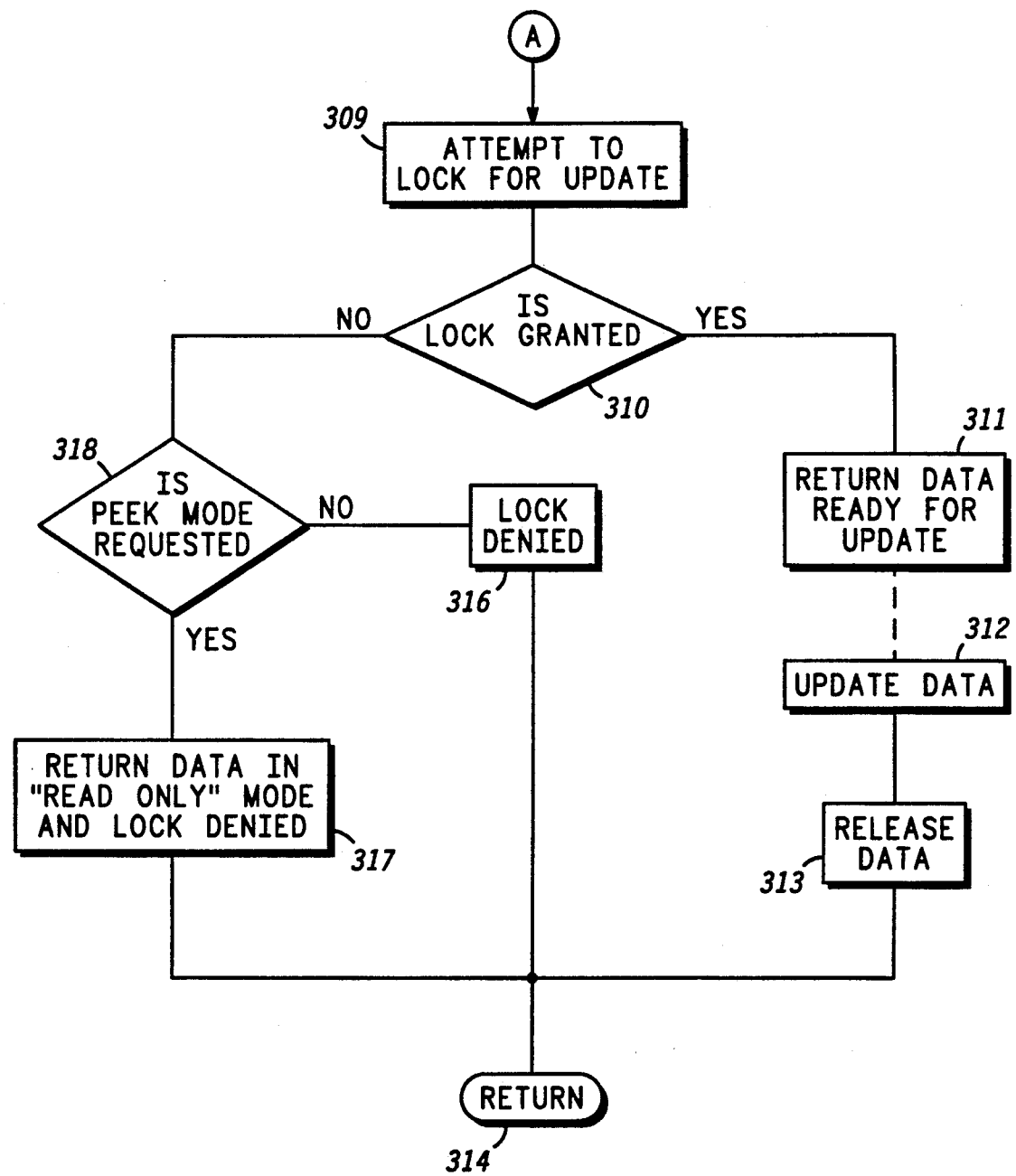

Referring now to FIGS. 3A-3B, a block diagram of a flowchart, generally designated 300, embodying the present invention is illustrated. The line numbers contained hereinafter in parenthesis refer to the lines of code in the code listing of Appendix A. The routine commences with step 301 where a request for data is received. The routine then determines if the data is locked by the application which transmitted the request, decision step 302 (line 120). Various types of data locks are described below in connection with FIG. 4. If the data is locked by the requesting application, the data is unlocked, step 303 (lines 122-125).

Once the data is unlocked in step 303, or if the data was not locked by the requesting application (decision step 302), the data is read in an updatable mode, step 304 (lines 138-150). This read of the data in an updatable mode is performed regardless of other existing locks.

The routine then determines if the read was successful, step 305 (lines 169). If the read is not successful, an error code is generated and returned to the requesting application, step 360 (lines 165-167).

If the read of the data is successful, the routine moves to step 307 (line 168) where the routine determines if the end-of-data mark is set. If the mark is set, an end-of-data exception is returned, step 308 (lines 170-172).

If an end-of-data mark is not present, the routine moves to step 309 (lines 176-180) where an attempt is made to lock the data for update. In decision step 310 (lines 179-185), the routine then determines if the update lock was granted. The update lock will be granted unless a second application has placed a lock on the data which prohibits update access. This is determined by checking an exception flag associated with the data. If the flag is set, the request will not be granted. If the flag is not set, the request will be granted.

If the update lock is granted, the process moves to step 311 (lines 187-190) where the data is returned to the requesting application ready for updating. The data is then updated by the application, step 312, and released, step 313. The routine then returns, step 314.

If the lock of step 309 is not granted, the routine moves to decision step 315 where it is determined if a peek mode was requested. If the peek mode was not requested, the lock is denied, step 316 (lines 195 and 198-200) and the routine returns, step 314.

If the peek mode is requested, the routine proceeds to step 317 (lines 195, 196, and 199) where the data is returned to the application in a read only mode and the update lock is denied. The routine then returns, step 314.

APPENDIX A

```
1  /*********************************************************************
2
3      Copyright 1987, 1988, 1989. All Rights Reserved Motorola Computer X Inc.
4
5      This software is provided to the purchaser under a license which
6      forbids reproduction in whole or in part except as provided in
7      writing by Motorola Computer X Inc.
8
9      Module         : dmfetr.c 1.5
10     Date submitted : 89/02/06 14:04:31
11     Author         : Valentin Oprescu
12     Origin         : cX
13     Description    : DMS layer in msm: fetches row(s).
14
15 *********************************************************************/
16
17 #ident "@(#) dmfetr.c:1.5"
18
19 #include <cX.h>
20 #include <dm/memo.h>
21 #include <dm/mte.h>
22 #include <dm/ddmcsa.h>
23 #include <dms.h>
24 #include <dms_codes.h>
25 #include <dm/dmsbase.h>
26 #include <dm/dmsadef.h>
27 #include <dm/dmswhere.h>
28 #include <dm/tcom.h>
29 #include <dm/lock.h>
30 #include <dm/octl.h>
31 #include <dm/drb.h>
32 /*>
33 *********************************************************************
34
35         procedure name: DMfetr
36         ==============
37
38 return value: -.
39 ------------
40
41 functional description: process message with "fetr" key.
42 ----------------------
43
44 side effects: None.
45 ------------
46
47 residence: DMS layer in msm process.
48 ---------
49
50 written by              date
51 ----------              ----
52 V. Oprescu              02/09/88
53
54 modified by             date              reason for modification
55 -----------             ----              -----------------------
56 R. Rosenthal            01/24/89          CSA->DMCA ref
```

```
57  */
58
59  void DMfetr()
60
61  /*
62  <*/
63  {
64
65    MEMO   *mptr;
66    int32  i;
67.   char   *pcptr;
68    DRB    locdrb;
69    uint32 savearea[6];
70    RESNODE *lockptr;
71
72    register DMMSG *tcmsgp;
73    register TCOM  *tcp = TC;
74    register MEMO  *tcmemop;
75    register cksum;
76
77    void   B_sticky();
78    void   dmpackr();
79    void   dmpswhere();
80    void   dmhowhere();
81    void   dmhash();
82    MEMO   *dmmkmemr();
83
84    tcmsgp= tcp->msgp;
85
86    /* check sum
87    cksum= CKSUMCT ^ ((DMSBUF *)(tcmsgp))->hkey;
88    for( i=0; i < ((DMSBUF *)(tcmsgp))->pcsize; i += 4 )
89      cksum ^= *((uint32 *)((char *)(tcmsgp)+((DMSBUF *)(tcmsgp))->pcpos+i));
90    if( cksum != ((DMSBUF *)(tcmsgp))->cksum ) {
91      tcmsgp->status= DME_MEMCOR;
92      return;
93    }
94    */
95
96    if( (tcmemop= tcp->memo) == NULL ) {     /* something is wrong! */
97      tcmsgp->status= DME_BUG;
98      return;
99    }
100
101   else if( tcmemop->type == MEMO_TYPE_VW ) { /* no memo for record exists */
102     /* make one */
103     if( (mptr= dmmkmemr( 0 ) ) == NULL ) {
104       tcmsgp->status= DME_VALOVF;
105       return;
106     }
107
108     /* and replace it as current memo */
109     tcmsgp->memoff= Blkmem(mptr);
110     tcmemop= tcp->memo= mptr;
111   }
112
113   else if( tcmemop->type == MEMO_TYPE_RC ); /* memo for record exists */
114
115   else {
116     tcmsgp->status= DME_MEMCOR;
117     return;
118   }
119
120   if( tcmemop->lockptr != NULL ) {
121     /* remove the current lock */
122     i= WeakenLock( tcmemop->lockptr,(uint32)(tcmemop->access),
123                    (uint32)(tcmemop->lock),0,0 );
124     tcmemop->lockptr= NULL;
125     tcmemop->access= tcmemop->lock= 0;
126   }
127
128   /* invoke fetch routines */
129   mptr= Memblk(tcmemop->father);   /* mptr points to a 'vw' memo */
130   tcp->octl= (OCTL *)(mptr->av1);
131
132   pcptr= (char *)(tcmsgp)+((DMSBUF *)(tcmsgp))->pcpos;
133
134   /* save context in case GrantLock fails */
135   if( (tcmsgp->flags & DMS_PEEK) == 0 )
136     (void)memcpy( savearea,&(tcmemop->name3),6*sizeof(uint32) );
137
```

```
138     /* look for D_CURRENT first */
139     if( ((DMSBUF *)(tcmsgp))->pcep == *((uint32 *)(pcptr+ADADEXEC)) )
140       (void)dmpackr(NULL); /* perform the read */
141
142     else if( *((uint16 *)(pcptr += ADBEGIN+2)) == STKYRID ) {
143       /* set the RID */
144       tcmemop->name3= *((uint32 *)(pcptr + 2 + 4 + 4));
145       (void)dmpackr(NULL); /* perform the read */
146     }
147
148     else if( ((OCTL *)(mptr->av1))->numbuckets != 0 ) {
149       /* hashed table */
150       if( ((DMSBUF *)(tcmsgp))->hkey != 0 ) /* hashed access */
151         (void)dmhash( dmpackr );
152       else /* physical sequential access to hash table */
153         (void)dmhowhere( dmpackr );
154     }
155
156     else { /* physical sequential access to physical sequential table */
157       tcmemop->name3= 0;
158       (void)dmpswhere( dmpackr );
159     }
160
161     ((DMSBUF *)tcmsgp)->nofrecs= ((OCTL *)(mptr->av1))->recctr;
162
163     /* check for error */
164     if( tcp->error != 0 ) {
165       ((DMSBUF *)(tcmsgp))->rid= 0;
166       ((DMSBUF *)(tcmsgp))->access= ((DMSBUF *)(tcmsgp))->lock= 0;
167       tcmsgp->status= tcp->error;
168     }
169     else if( tcmemop->name3 == 0 ) { /* EOO */
170       ((DMSBUF *)(tcmsgp))->rid= 0;
171       ((DMSBUF *)(tcmsgp))->access= ((DMSBUF *)(tcmsgp))->lock= 0;
172       tcmsgp->status= DMX_EMPTY;
173     }
174     else {
175       /* try to get the lock */
176       if( ((DMSBUF *)(tcmsgp))->lock == 0 )
177         ((DMSBUF *)(tcmsgp))->rid= (RID)(tcmemop->name3);
178
179       else if( (lockptr =
180                  GrantLock( (RESNODE *)&(tcmemop->name1),3,
181                             (uint32)(((DMSBUF *)(tcmsgp))->access),
182                             (uint32)(((DMSBUF *)(tcmsgp))->lock),
183                             (uint32)(mptr->access),(uint32)(mptr->lock),
184                             &(mptr->lockptr) )
185                ) != NULL ) {
186         /* lock was successfully established */
187         tcmemop->lockptr= lockptr;
188         ((DMSBUF *)(tcmsgp))->rid= (RID)(tcmemop->name3);
189         tcmemop->access= ((DMSBUF *)(tcmsgp))->access;
190         tcmemop->lock= ((DMSBUF *)(tcmsgp))->lock;
191       }
192
193       else { /* lock was denied */
194         ((DMSBUF *)(tcmsgp))->access= ((DMSBUF *)(tcmsgp))->lock= 0;
195         tcmsgp->status= DMX_LOCKDEN;
196         if( (tcmsgp->flags & DMS_PEEK) != 0 )
197           ((DMSBUF *)(tcmsgp))->rid= (RID)(tcmemop->name3);
198         else {
199           ((DMSBUF *)(tcmsgp))->rid= 0;
200           (void)memcpy( &(tcmemop->name3),savearea,6*sizeof(uint32) );
201         }
202       }
203     }
204
205     /* check for retain */
206     if(((DMSBUF *)(tcmsgp))->rid != 0 && (tcmsgp->flags & DMS_RETAIN)!= 0) {
207       (void)B_dup ( &locdrb,mptr->av2 );
208       locdrb.page= PAGENO(((DMSBUF *)(tcmsgp))->rid);
209       locdrb.options= B_RETAIN;
210       B_sticky(&locdrb);
211     }
212
213     /* all done */
214     return;
215   }
```

In the above example, the locking of data is referred to in several steps. There are four different types of data locks which may be present. An exclusive lock will prohibit other processes from reading, updating, or deleting the locked data. A shared read lock will permit other processes to read the locked data, but prohibit updating or deleting. A shared write lock will allow other processes to both read and update the data, but will prohibit row deletion. The final lock is a "no lock". The "no lock" allows other processes to read, update, or delete the data. However, the process placing the "no lock" on the data will not be permitted to update the data.

Locks and access modes may be independent of each other. Access modes may be either read or update. As an example, an application may request an exclusive lock on a record but only request read access.

The types of locks and their effect on subsequent processes which attempt to access the data are illustrated in FIG. 4. The vertical axis of the table shows the locking and access modes that an application has obtained for a row and that are now in effect. The horizontal axis represents the locking and access mode combinations that can be requested by a subsequent application that seeks access to the same record. The "Y" and "N" entries indicate whether or not that access is granted. The dash "-" indicates the combination is not applicable.

As an example, if the first application placed a shared read (SR) lock on the data, and sought both read and update access modes; a subsequent application attempting to place a shared write lock on the data while seeking both read and update access would be permitted read access, but not be permitted update access.

Therefore, a method and apparatus have been shown which accomplish the objectives of providing a method for retrieving and updating data in a real-time data base system utilizing a peek-mode format.

Thus, it will be apparent to one skilled in the art upon reviewing the foregoing description, that there has been provided in accordance with the invention, a process and method that fully satisfy the objects, aims, and advantages set forth above.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

We claim:

1. In a data base management system, a method of providing real-time access to data, said method comprising the steps of:
   receiving a data request from an application;
   reading said data in an updatable mode;
   requesting an update lock for said data;
   providing said data to said application in an updatable mode if said requested update lock is granted; and
   providing said data to said application in a read only mode if said requested update lock is denied.

2. The method of claim 1 further comprising the step of returning a lock denied notification to said application if said requested update lock is denied.

3. The method of claim 1 wherein said second step of providing said data comprises the steps of:
   determining if said data request contains a peek mode option;
   providing said data to said application in said read only mode if said requested update lock is denied and said peek mode option is in said data request; and
   returning a lock denied notification to said application if said requested update lock is denied.

4. The method of claim 1 further comprising the steps, following the step of receiving a data request, of:
   determining if said data is locked by said application; and
   unlocking said data if said data is locked by said application.

5. The method of claim 1 wherein said data is a data row of a data base.

6. The method of claim 1, following said first providing said data step wherein said data is provided in an updatable mode, further comprising the steps of:
   updating said data; and
   releasing said data.

7. In a data base management system, a method of providing real-time access to data, said method comprising the steps of:
   receiving a data request from an application;
   reading said data in an updatable mode;
   requesting an update lock for said data;
   providing said data to said application in an updatable mode if said requested update lock is granted;
   determining if said data request contains a peek mode option;
   providing said data to said application in a read only mode if said requested update lock is denied and said peek mode option is in said data request; and
   returning a lock denied notification to said application if said requested update lock is denied.

8. The method of claim 7 wherein said data is a data row of a data base.

9. The method of claim 7, following said first providing said data step wherein said data is provided in an updatable mode, further comprising the steps of:
   updating said data; and
   releasing said data.

10. In a data base management system, a method of providing real-time access to data, said method comprising the steps of:
    receiving a data request from an application;
    determining if said data is locked by said application;
    unlocking said data if said data is locked by said application;
    reading said data in an updatable mode;
    requesting an update lock for said data;
    providing said data to said application in an updatable mode if said requested update lock is granted;
    determining if said data request contains a peek mode option;
    providing said data to said application in a read only mode if said requested update lock is denied and said peek mode option is in said data request; and
    returning a lock denied notification to said application if said requested update lock is denied.

11. The method of claim 10 wherein said data is a data row of a data base.

12. The method of claim 10, following said first providing said data step wherein said data is provided in an updatable mode, further comprising the steps of:
  updating said data; and
  releasing said data.

13. A method of updating data in a real-time data base system, said method comprising the steps of:
  requesting said data;
  performing read only functions on said data if said data is not requested for update purposes and said data is not locked;
  performing an update of said data if said data is requested for update purposes and said data is not locked;
  marking said data as read only data if said data is requested for update purposes, said data is locked, and said request specifies a peek mode; and
  returning said data.

14. The method of claim 13 wherein said data is a data record of said data base.

15. The method of claim 13 further comprising the step of returning a failed message to a requesting process if said data is requested for update purposes, said data is locked, and said request does not specify said peek mode.

* * * * *